3,377,912
SPECTRAL PHOTOMETRIC SCANNER USING A FABRY-PEROT ETALON ROTATED ABOUT AN AXIS INCLINED TO THE OPTIC AXIS OF THE SCANNER
Harold W. Yates, Stamford, Conn., assignor to Barnes Engineering Company, Stamford, Conn., a corporation of Delaware
Filed Mar. 4, 1965, Ser. No. 437,098
3 Claims. (Cl. 88—14)

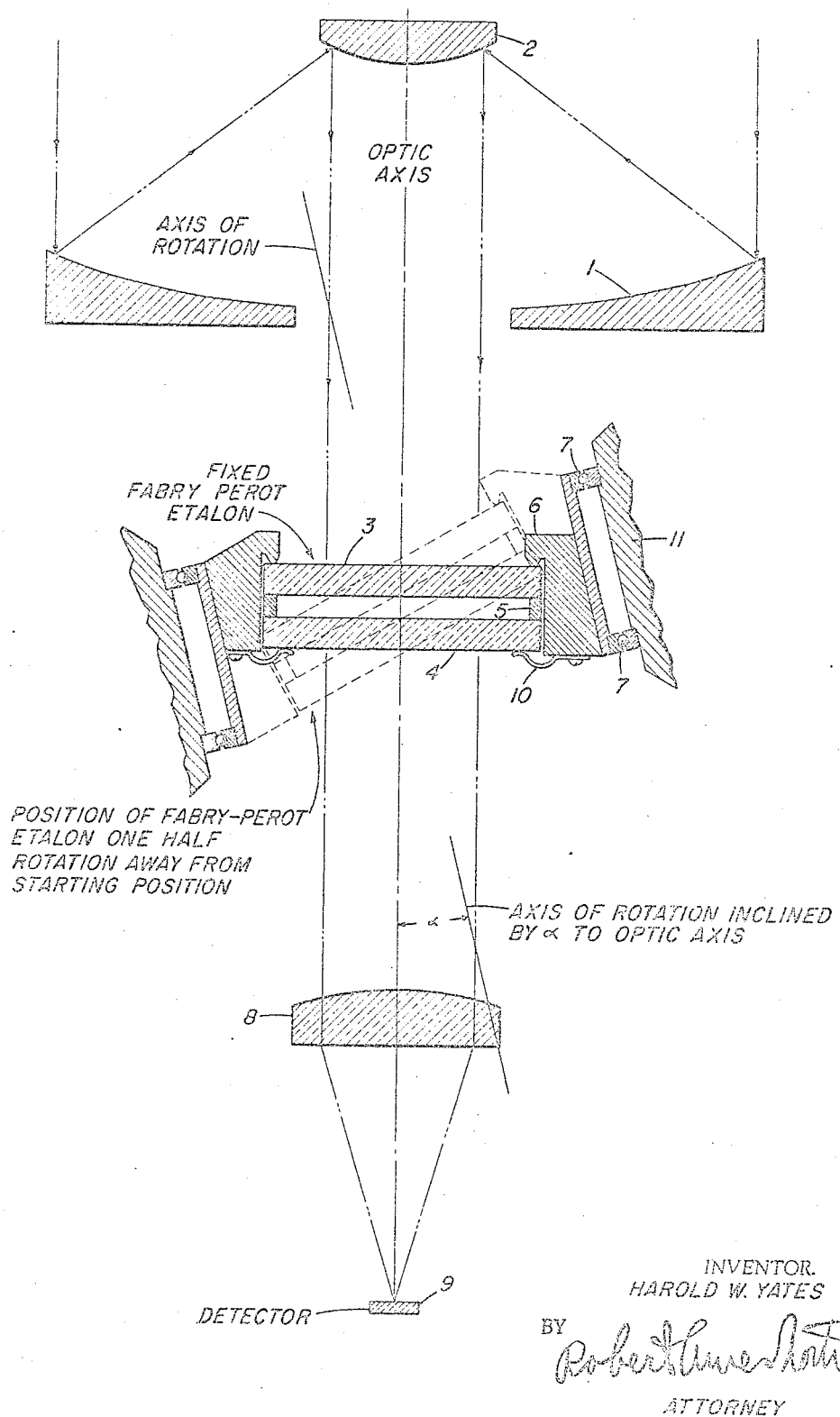

ABSTRACT OF THE DISCLOSURE

A scanner provided with collecting optics and a detector is scanned by rotating a Fabry-Perot etalon about an axis inclined at a small angle to the optical axis, the rotation of the etalon resulting in an oscillation of the etalon through an angle with respect to the optic axis, the oscillation being about an axis at right angles to the plane formed by the optic axis and the axis of rotation of the etalon. The scanning results from the fact that the Fabry-Perot etalon, with a constant plate spacing, is oscillated through an angle so that the angle at which the collected beam of the instrument strikes the face of the Fabry-Perot etalon is varied.

Background of the invention

Spectrometers have been built with semitransparent Fabry-Perot plates through which radiation passes and the spacing of the plates is varied periodically in order to produce a series of spectra determined by the basic Fabry-Perot equation $n\lambda = 2d \cos \theta$. The ordinary Fabry-Perot spectrometer utilizes plates which receive radiation substantially normal to their surfaces. In other words $\theta = 0$ and $\cos \theta$ is equal to unity.

In order to produce rapid scanning, various means of varying the spacing of the plates periodically have been employed, such as piezoelectric stacks or cylinders, magnetostrictive elements, and the like. The ordinary Fabry-Perot spectrometer poses several drawbacks which limit its use to a considerable extent. The first drawback is that it is extremely difficult to maintain the plates parallel as their distance is oscillated, for example by piezoelectric elements. Any non-uniformity in drive will result in destroying parallelism and introducing spurious results.

In order to avoid the drawback referred to above, Fabry-Perot plates rigidly fixed so that $d$ is constant in a framework have been oscillated about an axis in the middle of the space between the plates. In other words, this has kept $d$ constant and varied $\theta$.

No problem is presented by plates getting out of parallel, but the oscillating mechanism involved the moving of the whole of the two plates, which is a fairly substantial mass. This limits the frequency of oscillation possible with practical constructions. Both types of Fabry-Perot spectrometers are well illustrated in the copending application of Astheimer, Ser. No. 440,352, filed Mar. 4, 1965, in which the spectral scanning is preferably used for the detection of thermal discontinuity in gases, such as air. With moderate frequencies of oscillation for which the two types do not present severe driving problems, the two are quite useful and practical instruments. However, for certain purposes instruments are desired in which scanning is needed at a much higher frequency beyond that which is possible with oscillated fixed plate instruments. The piezoelectric varied spacings are capable of higher frequencies but, as pointed out above, suffer from the drawback of difficulties in maintaining parallelism, extreme precision of manufacture, and the like. There is therefore an extended field of instruments for which an improved spectrometer using variable $\theta$ scan at higher frequencies is needed.

Summary of the invention

The present invention deals with a solution of the problem presented by a variable-$\theta$ scan, and may be considered as an improvement on this modification of the scanners shown in the Astheimer application referred to above.

Essentially, in the present invention the Fabry-Perot plates are mounted in a rotating device, the plates being tilted with respect to the plane of rotation. This results in a continuous and repetitive tilting of the plates and as there is involved only rotation of a completely balanced organization of elements, extremely high rotating speeds are possible. The rotation of course is about an axis at a small angle to the optic axis of the spectrometer. There are no unbalanced forces, and high rotative speeds are easily obtained without vibration and with very low power consumption, the latter factor being of importance in instruments which may be used under conditions where the power available is very limited, as in space vehicles. The tilting of the Fabry-Perot plates or etalon is about an axis at right angles to the plane defined by the optic axis of the scanner and the axis of rotation of the etalon.

Brief description of the drawing

The drawings are a section through a scanning instrument along the optic axis thereof.

Description of the preferred embodiments

The spectrometer, which is shown diagrammatically, includes conventional Cassegrain collecting optics with a primary mirror 1 and secondary mirror 2, which collimate incoming radiation. A Fabry-Perot etalon is formed of parallel semitransparent plates 3 and 4, precisely spaced by a spacer 5 and mounted in a framework 6 by means of pressure fingers 10. The framework rotates in a sleeve 11 on bearings 7. It will be noted that the axis of rotation of the framework 6 is at an angle to the optic axis of the spectrophotometer as shown on the diagram, the angle being represented by $\alpha$. The axis of rotation and the optic axis of the instrument will be seen to define a plane, and the rotation of the etalon causes the plate to oscillate about an axis at right angles to the plane so defined.

After passing through the Fabry-Perot etalon, the collimated radiation is then imaged by a lens 8 onto a detector 9. As the framework 6 rotates, the etalon moves through an angle of $2\alpha$ and is shown after a half rotation in dashed lines in the drawing.

This, of course, varies $\theta$ in the basic Fabry-Perot equation correspondingly, and so changes the value of $\cos \theta$.

Let us assume operation in the infrared with a spacing $d$ of 2.5 microns. At one extreme position in the rotation, where $\theta$ is 0° with respect to the optic axis, the first order is $\lambda = 5\mu$. When $\alpha$ is 30°, there will be a total swing of 60°, so that the first order wavelength will vary from $5\mu$ to $2.5\mu$. The 60° swing represents therefore an octave, which is a practical maximum for a normal interferometric system. The drawing shows an angle $\alpha$ which is smaller and is used in instruments where a full octave is not needed.

The present invention is not concerned with any particular rotary drive, as these are conventional in many instruments and so no particular driving means is shown in the diagrammatic drawing.

I claim:

1. A scanning Fabry-Perot spectrometer comprising in combination and in optical alignment, (a) means for producing collimated radiation in the form of a beam having an optic axis,
(b) a Fabry-Perot etalon of fixed plate spacing,
(c) means for mounting the etalon for rotation about an axis of rotation making a small angle with the optic axis and defining therewith a plane, the etalon being oriented at such an angle to said axis of rotation that upon rotation the etalon oscillates about an axis parallel to the etalon plate surfaces and at right angles to the plane above defined,
(d) a radiation detector, and
(e) means for imaging the collimated light beam passing through the etalon onto the detector.

2. A scanning Fabry-Perot spectrometer according to claim 1 in which the Fabry-Perot etalon is mounted in a tilted framework and means are provided for rotating the framework about the axis of rotation.

3. A scanning Fabry-Perot spectrometer according to claim 1 in which the detector is responsive to infrared and the spacing of the Fabry-Perot plates in the etalon produces a first order spectrum within the infrared.

References Cited

UNITED STATES PATENTS 2,967,246    1/1961    Ostergren _____ 88—1

OTHER REFERENCES

Tolansky, S.: High Resolution Spectroscopy, 1947, Pitman Publishing Corp., N.Y.

Olender, H. A.: An Investigation of a Laser/Interferometer Altitude Monitoring Device, December 1962, thesis presented at Air Force Institute of Technology.

JEWELL H. PEDERSEN, *Primary Examiner.*

B. J. LACOMIS, *Assistant Examiner.*